United States Patent [19]
Barozzi

[11] Patent Number: 6,113,348
[45] Date of Patent: Sep. 5, 2000

[54] IMPULSE TURBINE

[75] Inventor: Pietro Barozzi, Vinovo, Italy

[73] Assignee: Dalesby Limited, London, United Kingdom

[21] Appl. No.: 09/324,762

[22] Filed: Jun. 3, 1999

[30] Foreign Application Priority Data

Jun. 4, 1998 [EP] European Pat. Off. .............. 98830345

[51] Int. Cl.[7] .................................. F03B 1/00; F03B 3/12
[52] U.S. Cl. ................................ 415/17; 415/26; 415/3.1; 415/4.1; 415/147; 416/197 B
[58] Field of Search ................. 415/3.1, 4.1, 17, 415/26, 29, 47, 48, 49, 50, 202, 147, 151; 416/197 B, 197 R, 197 A

[56] References Cited

U.S. PATENT DOCUMENTS

| | | |
|---|---|---|
| 1,474,386 | 11/1923 | Schmidt . |
| 3,936,244 | 2/1976 | Nordquist ................. 415/203 |
| 4,958,986 | 9/1990 | Boussuges ................. 415/188 |

FOREIGN PATENT DOCUMENTS

| | | |
|---|---|---|
| 175194 | 4/1904 | Germany . |
| 236560 | 3/1926 | United Kingdom . |
| 667129 | 2/1952 | United Kingdom . |
| 938967 | 10/1963 | United Kingdom . |

*Primary Examiner*—Edward K. Look
*Assistant Examiner*—Rhonda Barton
*Attorney, Agent, or Firm*—Rothwell, Figg, Ernst & Manbeck, P.C.

[57] ABSTRACT

An impulse turbine comprises at least one runner keyed to a drive shaft in association with a distributor unit which has, for each runner, a circular outlet for the supply of fluid from the distributor unit to the blades of a respective runner. Each outlet is arranged coaxially inside the respective runner and the distributor unit is shaped in a manner such as to define a substantially circular path for the fluid and to cause the fluid to emerge from the distributor unit through the at least one outlet predominantly tangentially relative to the outlet.

19 Claims, 7 Drawing Sheets

IMPULSE TURBINE

The present invention relates to impulse turbines, particularly hydraulic turbines, that is, turbines in which the potential pressure energy available is entirely transformed into kinetic energy solely in the distributor and not in the runner.

The invention relates, more specifically, to an impulse turbine comprising at least one runner keyed to a drive shaft in association with a distributor unit having, for each runner, a circular outlet for the supply of fluid from the distributor to the blades of a respective runner.

Known impulse turbines of the type indicated above, such as Pelton hydraulic turbines, have various advantages such as considerable structural simplicity and ease of maintenance as well as a high output and reliability in operation. However, they cannot be used for very small heights of fall in the order of a few meters and their use is, in any case, not very appropriate for medium and low heights of fall. It is, however, well known that most heights of fall which can easily be used for the production of hydroelectric energy, particularly by small energy production plants, are precisely medium, low and very low falls for which the use of Pelton turbines is generally not recommended. For small falls, it is therefore usually necessary to use reaction turbines such as Francis or Kaplan turbines which are of more costly construction and are more expensive to maintain.

Another disadvantage associated with Pelton hydraulic turbines is that the rate of revolution of their runners may increase abruptly and considerably as a result of an unexpected cessation of the user load, for example, because of a fault in the electrical network connected to the turbine, with the risk of causing destructive effects resulting from the large stresses produced by the centrifugal force. To prevent this problem, relatively simple safety systems, for example, systems of the type with a so-called "diverter plate", are associated with Pelton turbines for diverting the flow of fluid from the runner in these circumstances.

The main object of the present invention is to propose an impulse turbine distinguished by a relatively simple structure which is inexpensive to maintain and which can be employed to utilize medium or low heights of fall with a satisfactory output.

This object is achieved by the turbine according to the invention by virtue of the fact that each outlet is arranged coaxially inside the respective runner, and that the distributor unit is formed in a manner such as to define a substantially circular path for the fluid and to cause the fluid to emerge from the distributor unit through the at least one outlet predominantly tangentially relative to the outlet.

By virtue of this concept, the turbine according to the invention is structurally very simple, advantageously achieving a reduction in its production costs and reliability in operation. Since it is an impulse turbine, the runner blades never work in low-pressure conditions as in reaction turbines and they are therefore not subject to the risk of cavitation with consequent erosion of the blades. Moreover, the turbine according to the invention does not require the presence of deflector blades in the distributor for directing the flow of fluid correctly towards the runner blades, the correct direction of supply of the fluid to the runner blades being determined solely by the geometry of the distributor which helps to simplify the structure of the turbine and to minimise the losses due to friction inside the distributor so that the machine has an improved output close to the theoretical maximum.

Further characteristics and advantages of the invention will become clearer from the following detailed description, given with reference to the appended drawings provided purely by way of non-limiting example, in which.

Figure 1:
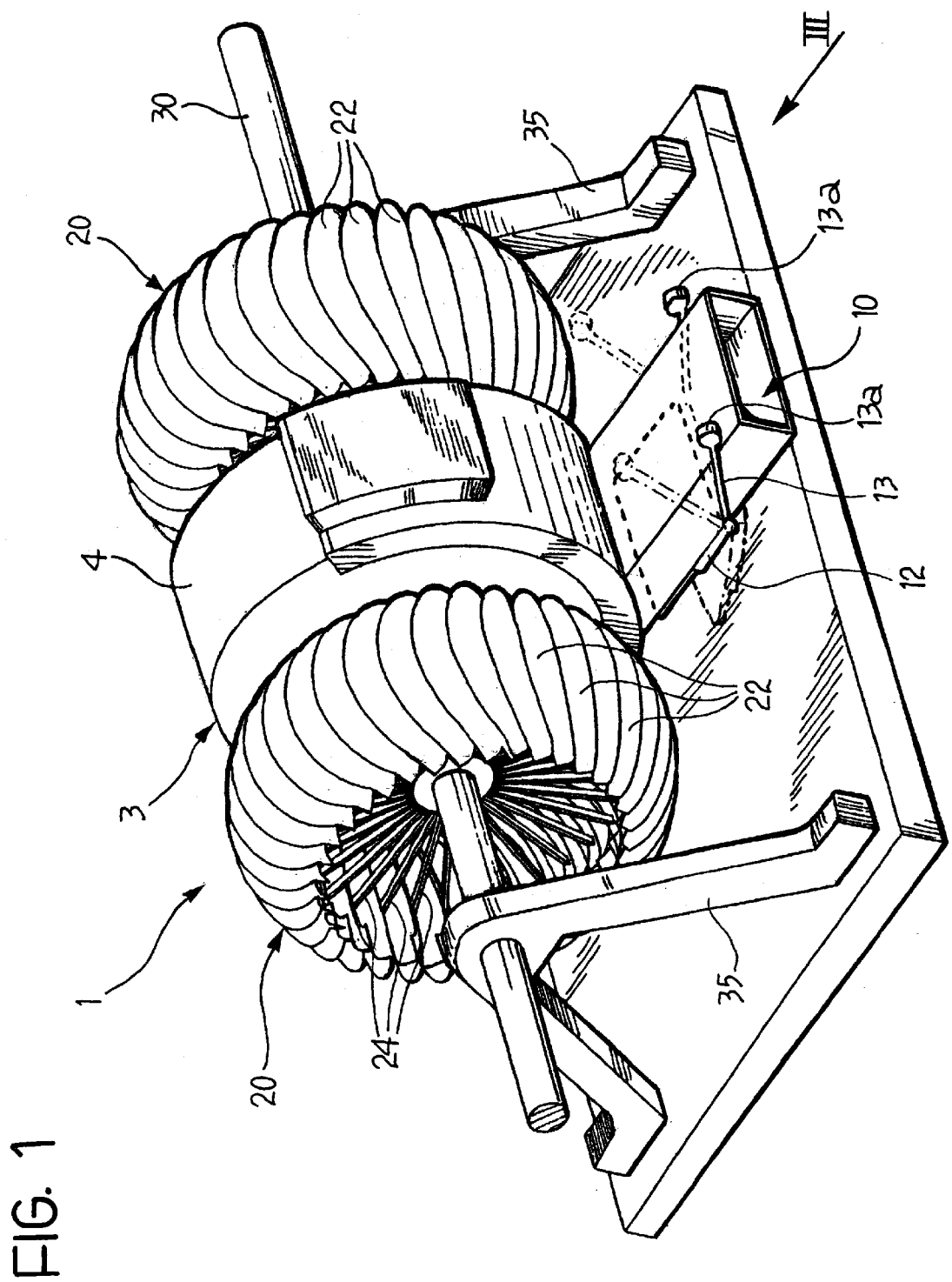
FIG. 1 is a perspective view of a turbine according to the invention.
Figure 2:
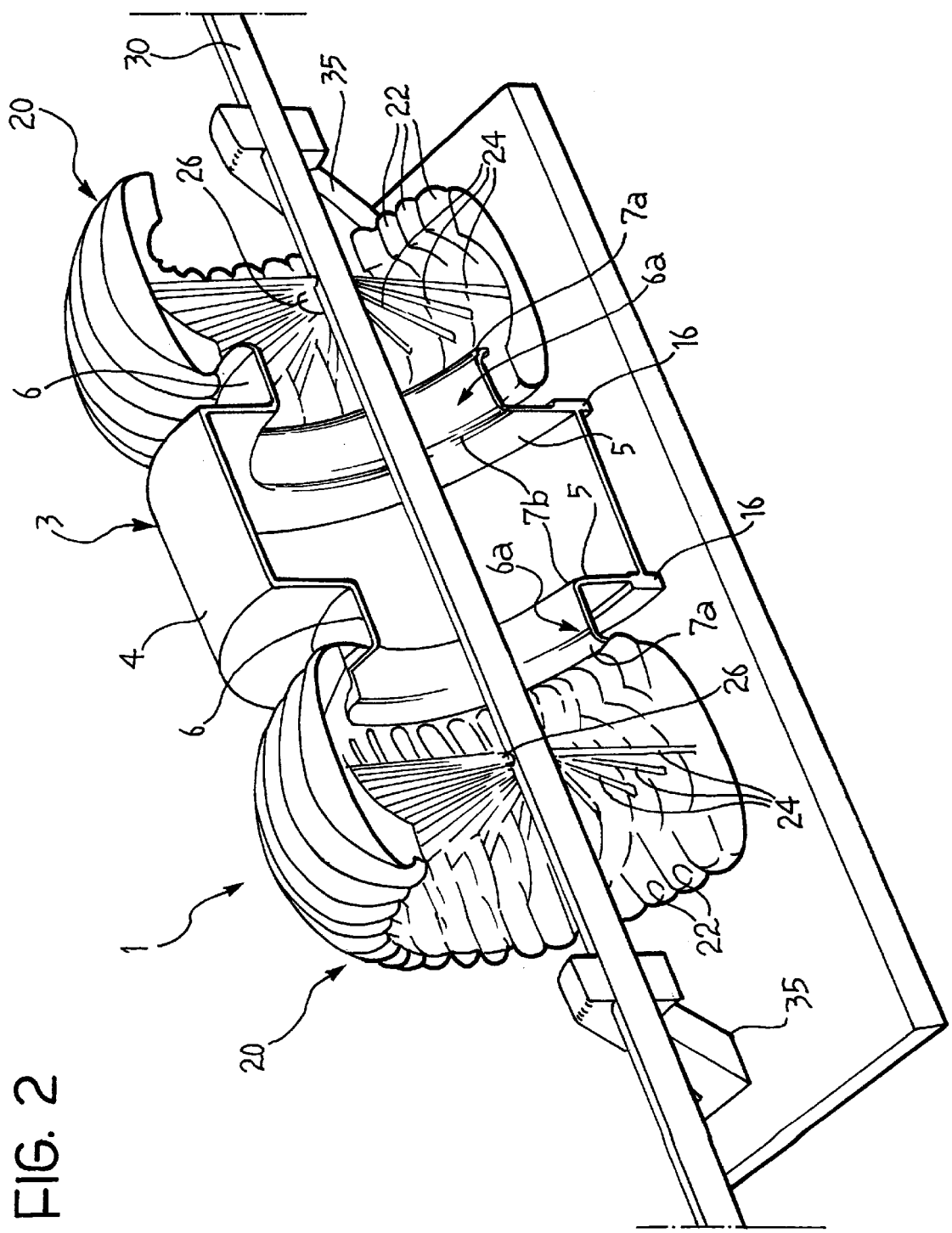
FIG. 2 is a longitudinally-sectioned view of the turbine of FIG. 1.
Figure 3:
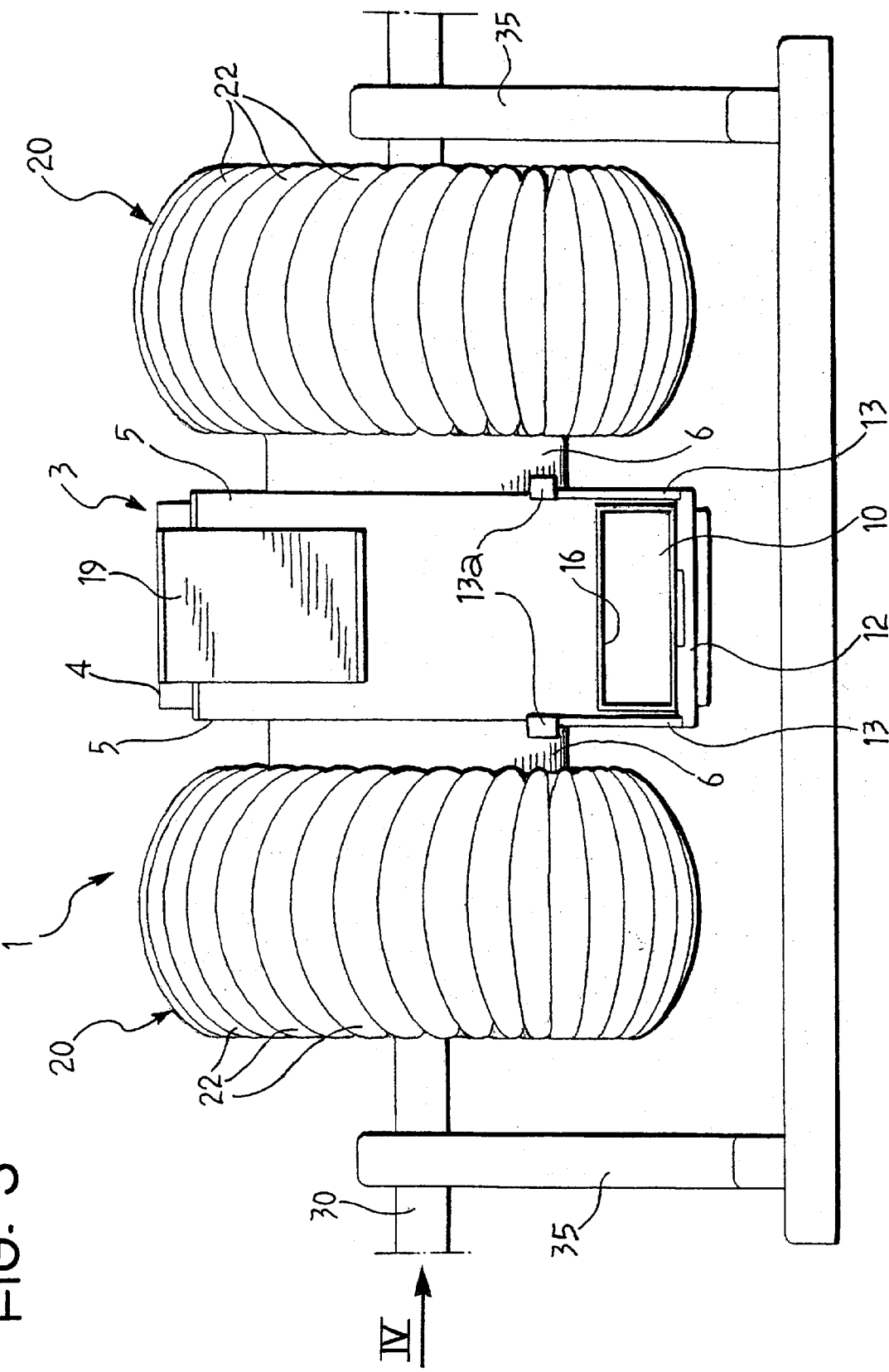
Figure 4:
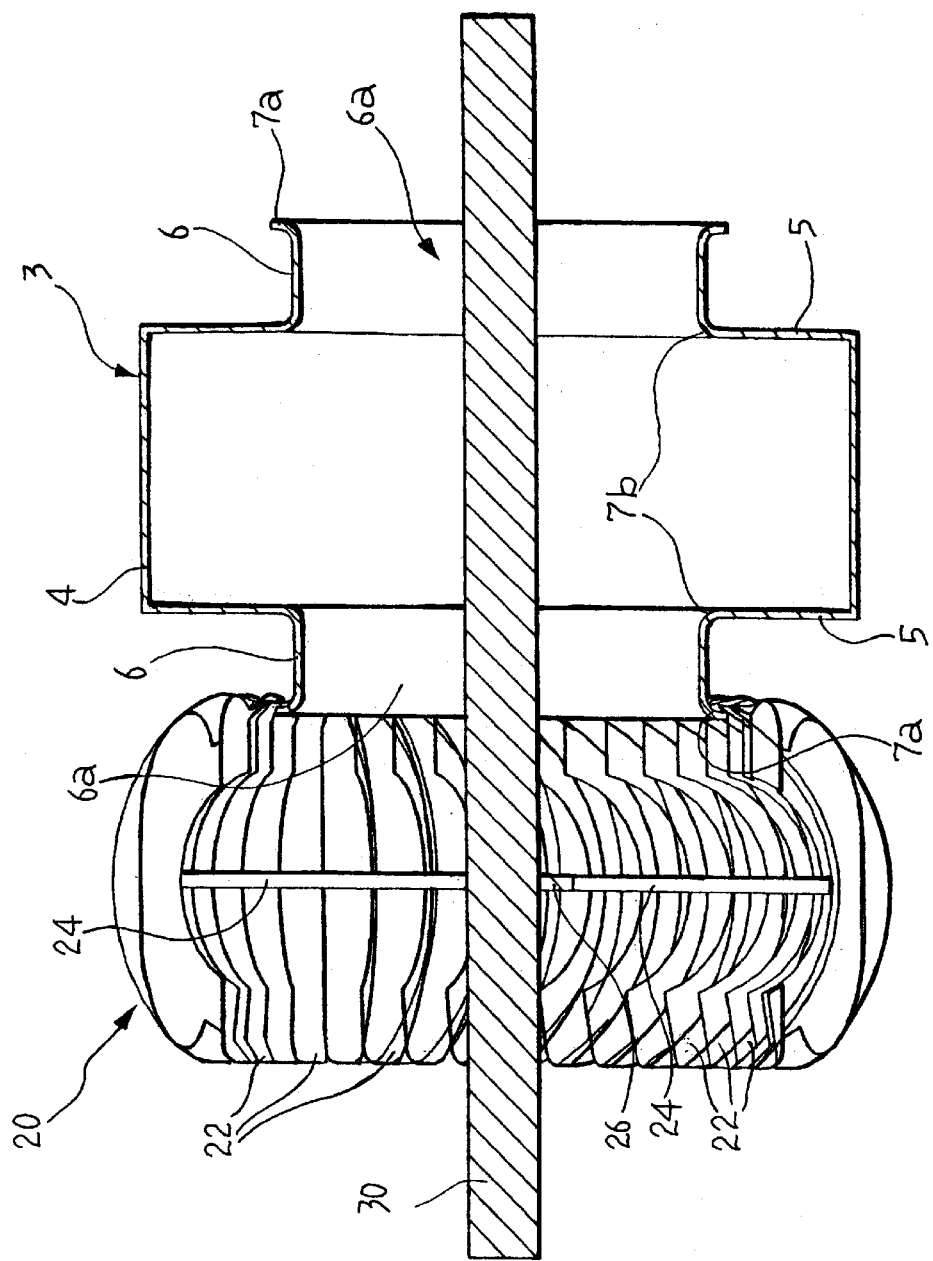
Figure 5:
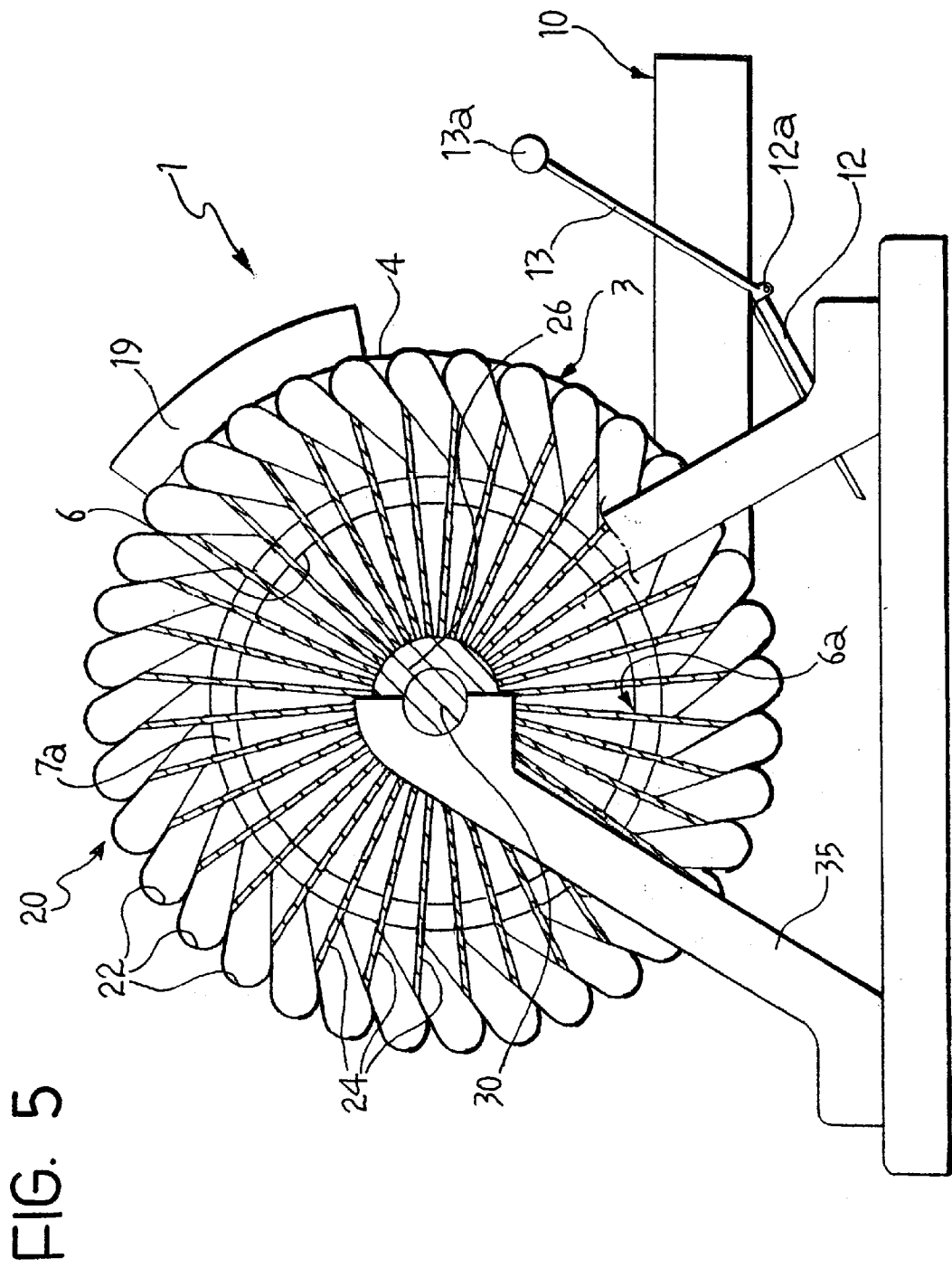
Figure 6:
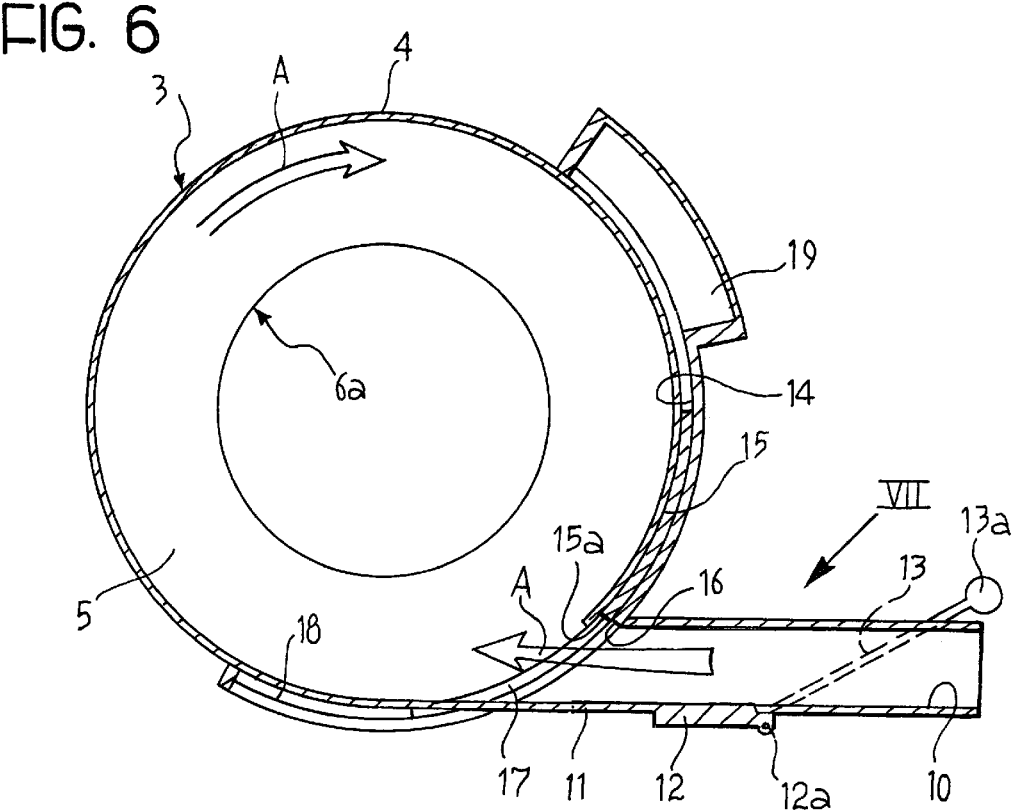
Figure 7:
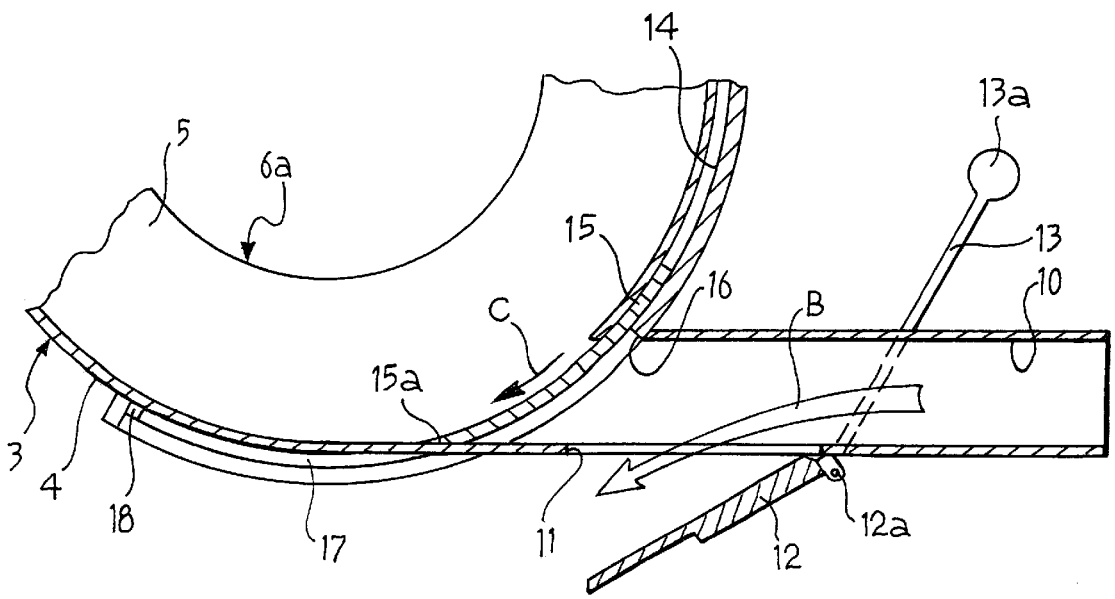
Figure 8:
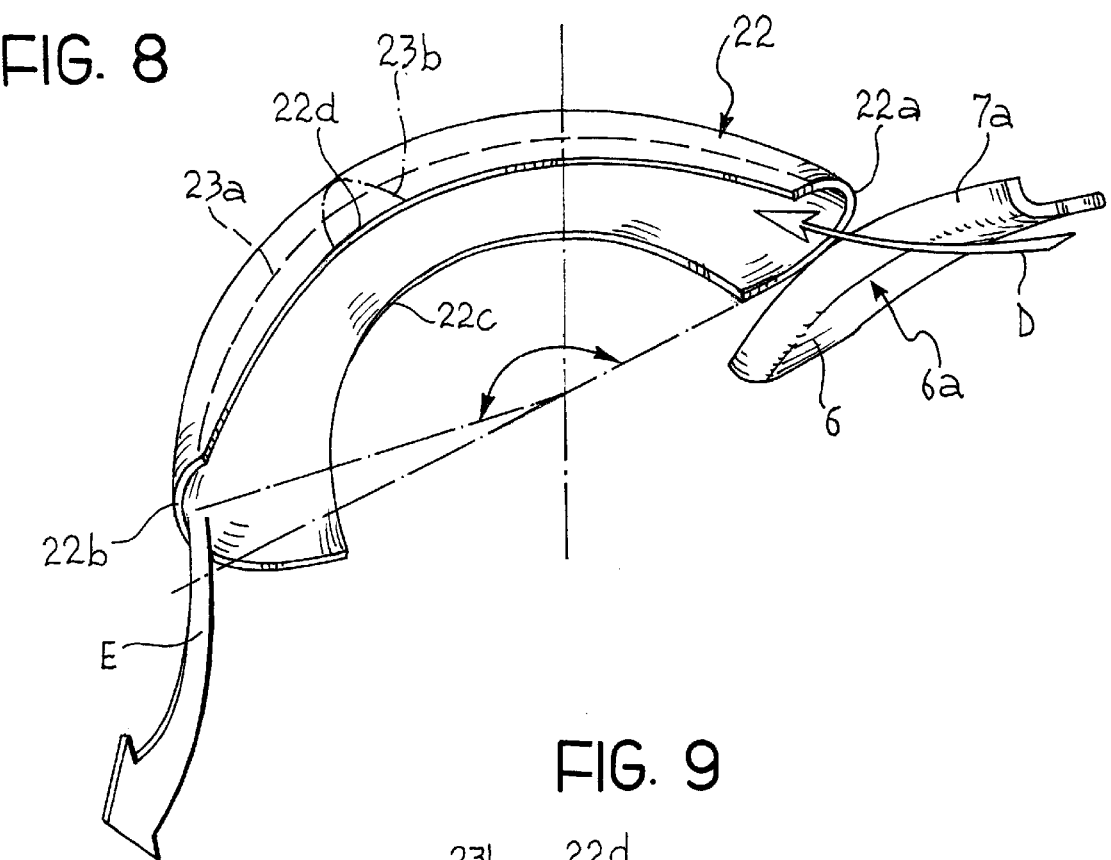
Figure 9:
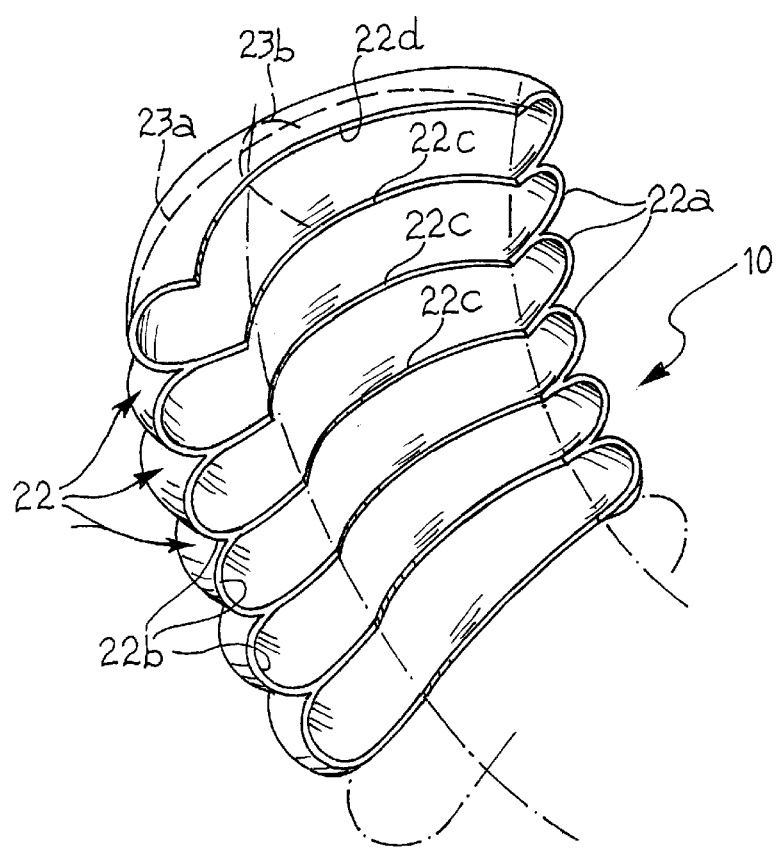

FIG. 3 is a front elevational view of the turbine shown in FIG. 1, from the side indicated by the arrow III, FIG. 4 is a sectioned front elevational view of the turbine of FIG. 3, on an enlarged scale, showing only one of its runners, FIG. 5 is a partially-sectioned side elevational view, from the side indicated by the arrow IV of FIG. 3, FIG. 6 is a sectioned side elevational view of the distributor unit of the turbine, FIG. 7 is a view similar to FIG. 6, of a detail of the distributor unit indicated by the arrow VII in FIG. 6, in a different operating condition, FIG. 8 is a schematic, perspective view of a runner blade of the turbine, showing the flow of the fluid emerging from the respective outlet and impinging on the blade, and FIG. 9 is a schematic, perspective view of a blade unit of a runner.

With reference to the drawings, an impulse turbine according to the invention, generally indicated 1, is of the total admission type. Although the following description refers specifically to a hydraulic impulse turbine, that is, a turbine which preferably uses water as the fluid, the invention may also be applied, for example, to a gas or steam impulse turbine with a few modifications within the capability of an expert in the art, for example, by the formation of several similar stages in series in order to achieve operation with velocity stages. The turbine 1 comprises, basically, a distributor unit 3, which is supplied with the working fluid through an inlet duct 10. The fluid is then supplied by the distributor 3 to at least one bladed runner 20 through a respective circular outlet 6a.

In the preferred embodiment shown in the drawings and described below, two runners 20 are associated with the distributor 3 in a symmetrically opposed arrangement with respect to a median plane thereof, so that the unit 3 has a symmetrical shape with two opposed outlets 6a. A turbine according to the invention may, however, alternatively, have a single runner, the axis of rotation of which may equally well be arranged horizontally or vertically with outlet at the top or at the bottom.

The distributor unit 3 comprises a main cylindrical body defined by a circular peripheral wall 4 defined axially by a pair of annular auxiliary walls 5 each of which carries a respective tubular body 6 coaxial with, but of smaller diameter than, the peripheral wall 4. Each body 6 defines a respective circular outlet 6a facing a respective runner 20. Both end edges, indicated 7a and 7b, of each body 6, in particular, the edge connected to the wall 5 and the edge adjacent the respective runner 20, respectively, are rounded so as not to disturb the flow of the fluid emerging from the unit 3. The body 6 has the function of providing the fluid with a small axial thrust which, in the absence of the body 6, would be almost zero, in order to favour the discharge of the fluid from the runner.

The inlet duct 10 preferably has a rectangular cross-section, at least in the vicinity of the unit 3, and is connected to the unit 3 tangentially in the region of the wall 4 in which a fluid-supply opening 16 opens. An arcuate guide seat 14 is formed along the wall 4, adjacent the opening 16, to enable a rectangular gate 15, also of arcuate cross-section, to slide (in the direction of the arrow C of FIG. 7) between a rest position, shown in FIG. 6, in which it is spaced from the opening 16 and from the duct 10, and a plurality of active positions in which the gate 15 at least partially closes the opening 16, intercepting the flow of fluid from the inlet duct 10 to the unit 3 through the opening 16. The gate 15 enables the flow of fluid admitted to the unit 3 and from the unit 3 to the runners 20 to be regulated effectively. FIG. 7 shows the condition in which the opening 16 is completely closed by the gate 15 as a result of sliding of the gate in the direction indicated by the arrow C.

Two appendages 17 extend from a transverse side 15a of the gate 15 in the direction of the sliding of the gate relative to the wall. 4 and are housed in respective elongate guide recesses 18 formed in the vicinity of the region in which the inlet duct 10 is connected to the peripheral wall 4 of the distributor unit 3. The appendages 17 occupy the extensions of the sliding guide 14 at the sides of the gate 15 when the gate at least partially opens the opening 16 and prevent the presence of corners or recesses which would cause the formation of vortices resulting in disturbance of the uniformity of the flow of the fluid in the unit 3.

The gate 15 is controlled, in particular, by an actuator of known type, for example, including a mechanically or hydraulically-operated jack, not shown in detail in the drawings, preferably housed in a casing 19 adjacent the wall 4 in the vicinity, of the sliding guide 14. The operation of this actuator is controlled automatically by sensor means (not shown) for detecting the rate of rotation of the runners 20 and the flow-rate of fluid in the inlet duct 10, in a manner such that the out-flow of fluid towards the runners is adjusted to the flow-rate upstream of the turbine 1 in order always to supply the maximum available power.

By virtue of the tangential positioning of the duct 10, the fluid admitted to the unit 3 is directed along a substantially circular path (indicated schematically by the arrows A in FIG. 6) with a small axial component which tends to bring about a uniform discharge of the fluid from the edges of the outlets 6a. As a result of the circular and uniform flow of fluid in the unit 3, the discharge of the fluid takes place uniformly around the peripheries of the outlets 6a and predominantly tangentially because of the centrifugal force.

An automatic safety-valve device is associated with the inlet duct 10 in the vicinity of the unit 3 for diverting the flow outside the distributor unit 3 when a pressure greater than a predetermined threshold value arises in the duct 10, in order to prevent water-hammer phenomena.

This safety device includes an outlet 11 formed in the inlet duct 10 and a plate-like shutter 12 of a shape corresponding to that of the outlet 11, articulated to the duct 10 at 12a so as to be movable between a closed configuration in which it is disposed sealingly against the outlet 11, and an open configuration in which it is spaced therefrom. In particular, the shutter 12 is subjected directly to the effect of the pressure of the fluid present in the duct 10 so that it can move from the closed configuration to the open configuration or vice versa as a result of the fluid pressure. Biasing means are associated with the shutter 12 for urging it towards its closed configuration and enable the shutter to be kept normally, that is, until the predetermined pressure threshold is exceeded, in its closed configuration in which the fluid passes normally through the duct 10 to reach the unit 3.

The means for biasing the shutter 12 may be of any known type, for example, of the counterweight-type, as shown in the drawings, including arms 13 fixed to the shutter 12 and carrying counterweights 13a at their opposite ends to the shutter 12, or of the resilient type comprising, for example, restraining springs.

In the event of an accidental fault in the electrical network connected to the turbine, the user load may unexpectedly cease or be substantially reduced so that the rate of revolution of the blades may increase abruptly with the risk of causing damage to plant and personnel. In these circumstances, the automatic actuator for operating the gate 15 causes the gate to slide in order to close the opening 16 completely and immediately, with the inevitable risk of water hammer phenomena in the duct 10. The excess pressure which is produced instantaneously in the duct 10 acts on the shutter 12 until, if the force is sufficient, it overcomes the force exerted on the shutter 12 by the biasing means, bringing the shutter to the open position to allow the fluid to flow out through the outlet 11, outside the unit 3 (arrow B of FIG. 7).

The runners 20 of the turbine 1 are keyed to a single drive shaft 30 extending coaxially through the unit 3 and connected, in known manner, to means for generating electrical energy or to other users (not shown), the shaft 30 being mounted so as to be rotatable relative to its supports 35.

Each runner 20 has a set of blades 22 connected to a hub 26 by means of spokes 24. Each blade 22 has an elongate, substantially semicircular shape and has its leading edge 22a facing the respective outlet 6a of the unit 3 and oriented tangentially relative to the outlet, in turn tangential to a plane perpendicular to the shaft 30, so that the blade receives directly the flow emerging from the respective outlet 6a in a direction substantially parallel to that of the fluid admitted to the distributor. In particular, it is not necessary to provide a deflector device for directing the fluid from the outlets 6a towards the blades 22 of the runners 20 since the fluid which emerges from the outlets 6a is already directed parallel to the leading edge 22a of each of the blades 22 (arrow D of FIG. 8). The angle between the leading edge 22a and the trailing edge 22b of each blade 22 is smaller than 180°, preferably 170°, so that the fluid expelled from the trailing edge 22b of each blade 22 (arrow E of FIG. 8) retains an axial component which favours its movement away from the respective runner 20.

Each blade 22 has an arcuate principal generatrix 23a lying on a plane tangential to the respective runner 20 and extending between the leading edge 22a and the trailing edge 22b of the blade. Although each blade 22 may have a flat envelope in the direction transverse its principal generatrix 23a, which would be advantageous from the point of view of constructive simplicity, it can be formed with a more efficient shape if it is shaped so as to have a secondary generatrix 23b, arranged transverse the principal generatrix 23a and also arcuate.

Each blade 22 is advantageously anchored to the adjacent blades 22 in the region of the opposed longitudinal edges 22c, 22d thereof, so that all of the blades 22 of the same runner 20 form a single body.

By virtue of the symmetrical structure of the turbine described as the preferred embodiment, the stresses acting on the distributor unit 3 and on the supports of the shaft 30 are also distributed symmetrically, balancing the axial thrusts and advantageously simplifying the structural and support elements of the turbine.

What is claimed is:

1. An impulse turbine comprising at least one runner keyed to a drive shaft in association with a distributor unit having, for each runner, a circular outlet for the supply of fluid from the distributor unit to the blades of a respective runner, wherein each outlet is arranged coaxially inside the respective runner and in that the distributor unit is formed in a manner such as to define a substantially circular path for the fluid and to cause the fluid to emerge from the distributor unit through the at least one outlet predominantly tangentially relative to the outlet.

2. An impulse turbine according to claim 1, wherein the distributor unit comprises a cylindrical body having a tangential inlet duct, the duct having associated means for regulating the flow-rate of fluid admitted to the distributor unit.

3. An impulse turbine according to claim 2, wherein the cylindrical body has a circular peripheral wall, and in that the inlet duct has a generally rectangular cross-section, at least in the vicinity of its connection to the peripheral wall.

4. An impulse turbine according to claim 2, wherein the means for regulating the flow-rate of fluid comprise a gate slidable along the peripheral wall of the distributor unit between a rest position in which it is spaced from the fluid-inlet duct and a plurality of active positions in which the gate at least partially intercepts the flow of fluid from the inlet duct to the distributor unit through a supply opening.

5. An impulse turbine according to claim 4, wherein the gate is operated as a function of the rate of rotation of the at least one runner and the flow-rate of fluid in the inlet duct.

6. An impulse turbine according to claim 4, wherein the gate has an arcuate cross-section corresponding to the peripheral wall of the distributor unit, and in that two elongate appendages extend from opposite ends of a transverse side of the gate in the direction of sliding thereof, the appendages being housed in respective guide recesses formed in the vicinity of a region of connection of the inlet duct to the peripheral wall of the distributor unit.

7. An impulse turbine according to claim 2, wherein the distributor unit includes an automatic safety-valve device which can divert the flow of fluid outside the distributor unit upon the detection of a pressure greater than. a predetermined threshold value in the inlet duct.

8. An impulse turbine according to claim 7, wherein the safety-valve device includes an outlet formed in the inlet duct and a plate-like shutter which is of a shape corresponding to that of the outlet and is subject to the effect of the pressure of the fluid, the shutter being articulated to the inlet duct so as to be movable between a closed configuration in which it is disposed against the outlet and an open configuration in which it is spaced from the outlet as a result of the pressure of the fluid.

9. An impulse turbine according to claim 8, wherein biasing means are associated with the plate-like shutter for urging it towards the closed configuration, the biasing means being able to keep the shutter in its closed configuration when a pressure no greater than the threshold value is present in the inlet duct and to allow it to adopt the open configuration for pressures greater than the threshold value.

10. An impulse turbine according to claim 9, wherein the biasing means are of the counterweight or resilient biasing-type.

11. An impulse turbine according to claim 1, wherein the distributor unit has, in the vicinity of each outlet, a respective tubular body with a diameter smaller than that of the circular peripheral wall, the two opposite ends of each tubular body for connection to an auxiliary wall interposed between the tubular body and the circular peripheral wall, and for the outlet of the fluid, respectively, having rounded edges.

12. An impulse turbine according to claim 1, wherein each runner comprises a set of elongate and arcuate blades, each of which has its leading edge facing towards the respective outlet of the distributor unit and oriented tangentially relative thereto.

13. An impulse turbine according to claim 12, wherein each blade has an arcuate principal generatrix lying on a plane arranged tangentially relative to the respective runner.

14. An impulse turbine according to claim 12, wherein the angle between the leading edge and the trailing edge of each blade is smaller than 180°, preferably about 170°.

15. An impulse turbine according to claim 12, wherein each blade has a secondary generatrix which is disposed transverse the principal generatrix and is also arcuate.

16. An impulse turbine according to claim 12, wherein each blade of the runner is fixed to the adjacent blades in the region of the opposed longitudinal edges thereof.

17. An impulse turbine according to claim 1, wherein the distributor unit has a symmetrical shape and comprises two opposed outlets, two runners being associated with the distributor unit in a symmetrically opposed arrangement relative to a median plane thereof.

18. An impulse turbine according to claim 17, wherein the two runners are keyed to a single drive shaft which extends coaxially with the distributor unit through a respective hub connected to the blades by means of a series of spokes.

19. An impulse turbine according to claim 1, wherein the distributor unit has no deflectors for directing the flow towards the blades of the at least one runner.

* * * * *